(12) United States Patent
Sekine et al.

(10) Patent No.: US 8,767,951 B2
(45) Date of Patent: Jul. 1, 2014

(54) TALK DECIDING SYSTEM

(75) Inventors: Satoshi Sekine, Hamamatsu (JP); Hiraku Okumura, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1633 days.

(21) Appl. No.: 11/895,231

(22) Filed: Aug. 22, 2007

(65) Prior Publication Data

US 2008/0056483 A1    Mar. 6, 2008

(30) Foreign Application Priority Data

Aug. 31, 2006   (JP) .................. 2006-235746

(51) Int. Cl.
*H04M 9/08* (2006.01)

(52) U.S. Cl.
USPC .................. 379/406.05; 379/406.07

(58) Field of Classification Search
CPC ... H04M 9/082; H04M 9/085; H04M 1/6033; H04M 3/002; H04M 9/08; H04B 3/234; H04B 3/23; H04B 3/237; H04R 3/02
USPC ............. 379/406.01–406.16, 410, 387, 389, 379/406, 388.04, 3, 387.01, 388.01, 388.02, 379/388.03, 388.05, 388.06, 390.02, 379/420.01; 381/71.1, 381, 94.1; 370/287, 370/289; 455/570
See application file for complete search history.

(56) References Cited

U.S. PATENT DOCUMENTS

| | | | |
|---|---|---|---|
| 5,193,112 A | | 3/1993 | Sano |
| 5,920,834 A | * | 7/1999 | Sih et al. .................. 704/233 |
| 6,192,126 B1 | * | 2/2001 | Koski .................. 379/406.14 |
| 6,868,157 B1 | | 3/2005 | Okuda |
| 6,968,064 B1 | * | 11/2005 | Ning .................. 381/66 |
| 7,577,248 B2 | * | 8/2009 | McCree .................. 379/406.08 |
| 2006/0018460 A1 | * | 1/2006 | McCree .................. 379/406.08 |
| 2008/0056483 A1 | * | 3/2008 | Sekine et al. .................. 379/406.05 |

FOREIGN PATENT DOCUMENTS

| | | |
|---|---|---|
| EP | 0847180 A1 | 6/1998 |
| JP | 3218150 | 9/1991 |

OTHER PUBLICATIONS

European Search Report (Citing EP-A-0 847 180 and U.S. 2006/018460 A1, dated Dec. 27, 2007).

* cited by examiner

*Primary Examiner* — Md S Elahee
*Assistant Examiner* — Akelaw Teshale
(74) *Attorney, Agent, or Firm* — Pillsbury Winthrop Shaw Pittman LLP

(57) ABSTRACT

A talk deciding system includes a receiving portion which receives far-end side decision information indicating a talking state on a far-end side, an inputting portion which inputs an emitted signal from the far-end side, a speaker which emits the emitted signal being input into the inputting portion, a microphone which picks up a voice on a near-end side and outputs a picked-up signal, and a deciding portion which preliminarily decides a talking state on the near-end side based on the picked-up signal being output from the microphone and the emitted signal being input into the speaker, and generates near-end side decision information indicating a talking state on the near-end side. The deciding portion decides the talking state on the near-end side based on the far-end side decision information being received at the receiving portion and the near-end side decision information.

3 Claims, 3 Drawing Sheets

FIG. 2

| NEAR-END DECISION INFORMATION \ FAR-END DECISION INFORMATION | NEAR-END SIDE SINGLE TALK | FAR-END SIDE SINGLE TALE | DOUBLE TALK | SILENT |
|---|---|---|---|---|
| NEAR-END SIDE SINGLE TALK | DOUBLE TALK (INITIAL) | OK | DOUBLE TALK (INITIAL) OR NEAR-END SIDE SINGLE TALK | SILENT → NEAR-END SIDE SINGLE TALK |
| FAR-END SIDE SINGLE TALE | OK | SILENT (DOUBLE TALK END) | DOUBLE TALK → FAR-END SIDE SINGLE TALK | OK |
| DOUBLE TALK | DOUBLE TALK (INITIAL) OR FAR-END SIDE SINGLE TALK | DOUBLE TALK → NEAR-END SIDE SINGLE TALK | OK | NEAR-END SIDE SINGLE TALK NEAR-END: IMMEDIATELY AFTER START OF TALK FAR-END: IMMEDIATELY AFTER END OF TALK |
| SILENT | SILENT → FAR-END SIDE SINGLE TALK | OK | FAR-END SIDE SINGLE TALK NEAR-END: IMMEDIATELY AFTER THE END OF TALK FAR-END: IMMEDIATELY AFTER THE START OF TALK | OK |

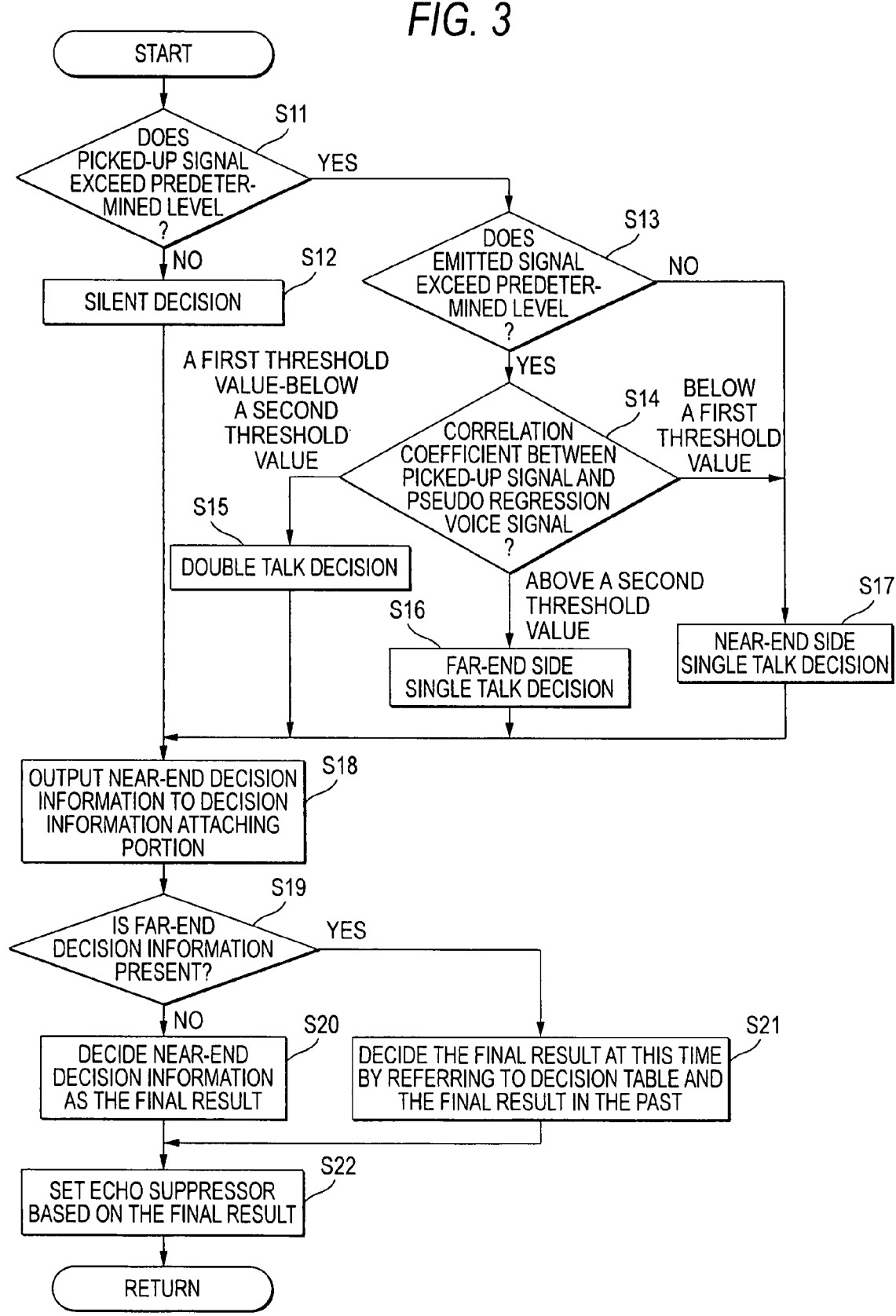

TALK DECIDING SYSTEM

BACKGROUND OF THE INVENTION

The present invention relates to a talk deciding system used in a voice talk, and the like and, more particularly, a talk deciding system for making exactly a talk decision such as a double talk, and the like.

In order to attend a talk session (communication conference) from the remote location, a talk session system equipped with a speaker and a microphone is spreading. In the talk session system, the voice picked up by the microphone is transmitted to a destination (far-end side) and the voice received from the far-end side is emitted from the speaker of own device (near-end side).

However, the talk session system is constructed to provide the speaker and the microphone in the same space. For this reason, when the voice received from the far-end side is emitted from the speaker, this voice is picked up by the microphone and sent out to the far-end side. As a result, a noise such as an echo, or the like is generated.

Therefore, as shown in Patent Literature 1, the talk session system having an echo canceller function has been proposed. The echo canceller of this system emits the voice received from the far-end side from the speaker and also inputs this voice into an adaptive filter. The adaptive filter filters the voice received from the far-end side by using a filter coefficient that estimates a transmission route from the speaker to the microphone, and generates an artificial regression voice. This echo canceller cancels the echo component by subtracting this artificial regression voice from the picked-up voice of the microphone.

[Patent Literature 1] JP-A-3-218150

However, the echo canceller in Patent Literature 1 could not completely cancel the echo component. In other words, the adaptive filter generates the artificial regression voice as described above, but this artificial regression voice is not perfectly identical to the voice coming from the speaker to the microphone and thus a component that is not perfectly cancelled still remains.

Therefore, when the talker on the far-end side is talking but the talker on the near-end side is not talking (referred to as a "far-end side single talk" hereinafter), it may be considered that a gain of the microphone on the near-end side should be suppressed. In this case, the accuracy of sensing the far-end side single talk becomes the problem. In other words, when the noise or the sudden sound is caused on the near-end side, it is often misunderstood that both the far-end side and the near-end side are talking (referred to as a "double talk" hereinafter) or only the near-end side is talking (referred to as a "near-end side single talk" hereinafter). As a result, the gain of the microphone on the near-end side was not suppressed and thus the echo could not be cancelled.

SUMMARY OF THE INVENTION

It is an object of the present invention to provide a talk deciding system whose accuracy in sensing a far-end side single talk, a near-end side single talk, a double talk, and a silent is improved.

A talk deciding system of the present invention includes a receiving portion which receives far-end side decision information indicating a talking state on a far-end side; an inputting portion which inputs an emitted signal from the far-end side; a speaker which emits the emitted signal being input into the inputting portion; a microphone which picks up a voice on a near-end side and outputs a picked-up signal; and a deciding portion which preliminarily decides a talking state on the near-end side based on the picked-up signal being output from the microphone and the emitted signal being input into the speaker, and generates near-end side decision information indicating a talking state on the near-end side; wherein the deciding portion decides the talking state on the near-end side based on the far-end side decision information being received at the receiving portion and the near-end side decision information.

According to this configuration, the far-end side decision information indicating the talking state on the far-end side is received. Here, the talking state on the far-end side means the talking state decided by the device on the far-end side, and indicates the far-end side single talk, the near-end side single talk (the near-end side single talk mentioned herein indicates a state that only the talker of the device on the far-end side is talking), the double talk, and the silent, for example. Also, the deciding portion decides preliminarily the talking state on the near-end side based on a level difference between the picked-up signal and the emitted signal. Here, the deciding portion may decide the talking state based on the correlation coefficient between the pseudo regression voice signal, which is obtained by filtering the emitted signal by means of the adaptive filter, and the picked-up signal. The deciding portion generates the result of the preliminary decision as the near-end side decision information (near-end decision information). The deciding portion decides finally a talking state on the near-end side based on the near-end side decision information and the far-end side decision information. A table defining the final result based on the near-end side decision information and the far-end side decision information may be prepared.

For example, when the near-end side decision information indicates the double talk and the far-end side decision information indicates the near-end side single talk, the final result may be decided as the far-end side single talk. Also, when the near-end side decision information indicates the double talk and the far-end side decision information indicates the far-end side single talk, the final result may be decided as the near-end side single talk. When the near-end side decision information and the far-end side decision information are different, it may be decided adequately depending on the using situation how the final result should be defined.

In this invention, the deciding portion holds the decided talking state on the near-end side, and decides the talking state at this time on the near-end side based on the far-end side decision information, the near-end side decision information, and the talking state on the near-end side decided and held in a past.

According to this configuration, the decided final result is held. The final result at this time is decided based on the held result, the far-end side decision information, and the near-end side decision information. For example, when the far-end side decision information indicates the double talk and the near-end side decision information indicates the near-end side single talk, the results in the past are referred to. When the preceding final result indicates the double talk, the final result at this time is decided as the far-end side single talk. Also, when the preceding final result indicates the far-end side single talk, the final result at this time is decided as the double talk.

Also, the talk deciding system of the present invention further includes a transmitting portion which transmits the near-end side decision information being generated at the deciding portion to the far-end side.

According to this configuration, the near-end side decision information generated by the deciding portion is transmitted to the far-end side. Therefore, the accuracy of sensing is also improved on the far-end side. Here, since the far-end side decision information received from the far-end side and also the information of the talking state decided finally are not transmitted, a loop of information is never formed.

Also, the talk deciding system of the present invention further includes an adaptive echo canceller which has an adaptive filter for receiving the emitted signal and outputting a pseudo signal of a regression voice signal that goes around from the speaker to the microphone, and a post processor for subtracting the pseudo signal from the picked-up signal; wherein the deciding portion preliminarily decides a talking state on the near-end side based on the pseudo signal, the picked-up signal, and the emitted signal.

According to this configuration, the adaptive echo canceller is provided. The talking state on the near-end side can be decided with good accuracy by deriving the correlation between the pseudo signal that the adaptive filter outputs and the picked-up signal. For example, when the correlation coefficient between the pseudo signal and the picked-up signal is below a first predetermined value, the final result is decided as the near-end side single talk. When the correlation coefficient is in excess of a second predetermined value, the final result is decided as the far-end side single talk. When the correlation coefficient is above the first predetermined value but below the second predetermined value, the final result is decided as the double talk.

Also, the talk deciding system of the present invention further includes an echo suppressor which attenuates the voice signal to be output to the far-end side; wherein the deciding portion sets whether or not an attenuation should be made by the echo suppressor and a level of attenuation, based on the decided talking state on the near-end side.

According to this configuration, whether the attenuation by the echo suppressor is needed or not and a level of attenuation are set based on a final result. For example, when the final result is either of the far-end side single talk and the silent, the echo suppressor is caused to attenuate the signal and, when the final result is either of the near-end side single talk and the double talk, the echo suppressor is not caused to attenuate the signal. In this case, even in the case of the double talk, the echo suppressor may be caused to attenuate the signal.

According to the present invention, the final result is decided based on decision information, obtained by deciding the far-end side single talk, the near-end side single talk, the double talk, and the silent based on picked-up signal, emitted signal, and pseudo regression voice signal of the adaptive filter, and decision information received on the far-end side. Therefore, the accuracy of sensing can be improved.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a view showing a decision table; and

FIG. 3 is a flowchart showing an operation of an ST/DT deciding portion 20.

DETAILED DESCRIPTION OF THE PREFERRED EMBODIMENTS

Figure 1:
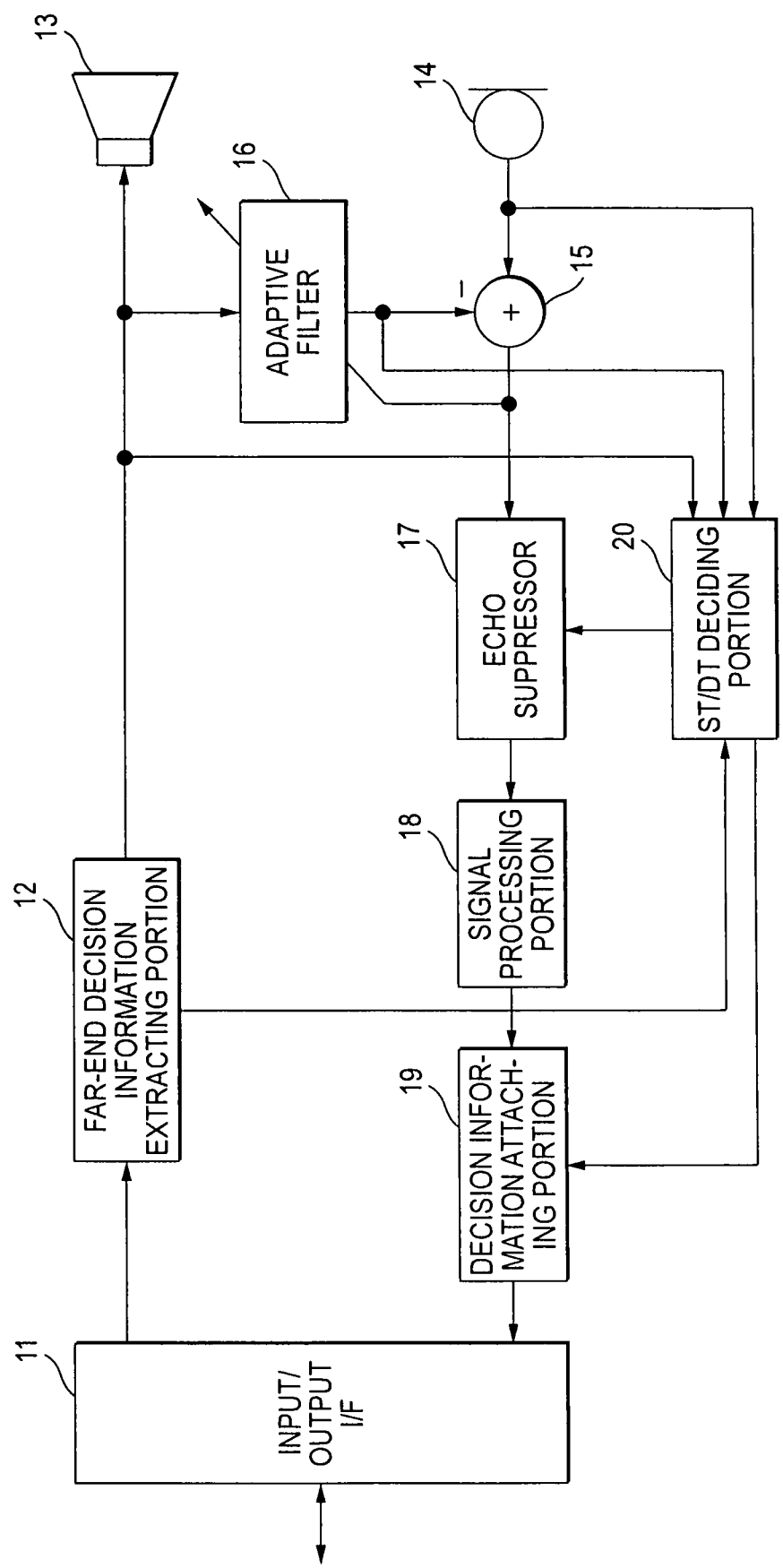
FIG. 1 is a block diagram showing a configuration of a talk session system.

A talk session system according to an embodiment of the present invention will be explained with reference to the drawings hereinafter. FIG. 1 is a block diagram of the talk session system according to this embodiment.

This talk session system includes an input/output I/F 11 connected to an external device, a far-end decision information extracting portion 12, a speaker 13, a microphone 14, an adder 15, an adaptive filter 16, an echo suppressor 17, a signal processing portion 18, a decision information attaching portion 19, and an ST/DT deciding portion 20.

The input/output I/F 11 has a network interface, and the like, and connects this talk session system to the external device. For example, the input/output I/F is connected to other device (far-end side) via the network to transmit/receive voice information. The voice information input into the input/output I/F 11 via the network is input into the far-end decision information extracting portion 12.

The far-end decision information extracting portion 12 converts the voice information in the input protocol format into a digital voice signal, and then outputs this signal to the speaker 13, the adaptive filter 16, and the ST/DT deciding portion 20. In the present embodiment, descriptions of an amplifier for amplifying the voice signal supplied to the speaker, a DA converter for converting the digital voice signal into an analog voice signal, a front-end amplifier installed into the microphone, and an AD converter for converting the analog voice signal picked up by the microphone into the digital voice signal are omitted herein. Also, unless particular recitations are given, all voice signals transferred in the system are assumes as the digital voice signal.

Also, the far-end decision information extracting portion 12 extracts far-end decision information attached to the input voice information. The extracted far-end decision information is input into the ST/DT deciding portion 20. The far-end decision information, although described in detail later, shows that states of a far-end side single talk, a near-end side single talk, a double talk, and a silent (no talk is made on both the near-end side and the far-end side) are caused in the device connected on the far-end side.

The microphone 14 picks up the voice around own system (near-end side), and outputs the voice signal to the adder 15 and the ST/DT deciding portion 20.

The adder 15 subtracts an output signal of the adaptive filter 16 from the voice signal input from the microphone 14. The adder 15 outputs this difference signal to the echo suppressor 17.

The adaptive filter 16 filters the voice signal input from the far-end decision information extracting portion 12 by using a predetermined filter coefficient to generate a pseudo regression voice signal (artificial echo component). In other words, a transfer function of an acoustic transferring system leading from the speaker 13 to the microphone 14 is estimated and then the voice signal supplied to the speaker is filtered by using this estimated filter coefficient, so that an echo component reaching from the speaker 13 to the microphone 14 is artificially generated. The pseudo regression voice signal is output to the adder 15 and the ST/DT deciding portion 20.

As described above, the adder 15 subtracts the pseudo regression voice signal from the voice signal picked up by the microphone 14 to output a difference signal in which an echo component is attenuated. This difference signal is output to the echo suppressor 17 and the adaptive filter 16.

The adaptive filter 16 updates the filter coefficient by using the difference signal that is output from the adder 15 and the voice signal supplied to the speaker 13 such that the echo component that could not be completely cancelled, i.e., the difference signal is reduced to zero (minimum). A predetermined algorithm is used in updating the filter coefficient.

The echo suppressor 17 outputs the input difference signal to the signal processing portion 18 as it is or after it attenuates the signal. The ST/DT deciding portion 20 sets whether or not the signal should be attenuated and a level of the attenuation if such attenuation is applied. For example, in the case of the far-end side single talk and the silent, the difference signal is set to zero or an infinitesimal level while, in the case of the double talk or the near-end side single talk, the difference signal is set to be output as it is or after such signal is attenuated slightly.

The signal processing portion 18 is constructed by a noise gate, a compressor, or the like, and suppresses an excessive signal component that could not be attenuated by the echo suppressor 17 by a nonlinear processing. This nonlinear processing may be executed at all times or may be ON/OFF-controlled by the ST/DT deciding portion 20. The voice signal suppressed by the signal processing portion 18 is output to the decision information attaching portion 19.

The decision information attaching portion 19 converts the voice signal input from the signal processing portion 18 into voice information that is suited to the protocol format of the network, and outputs this information to the input/output I/F 11. Also, the decision information attaching portion 19 attaches decision information decided by the ST/DT deciding portion 20 to this voice information.

The ST/DT deciding portion 20 decides a talking condition of its own device, i.e., discriminates the near-end side single talk, the far-end side single talk, the double talk, and the silent. The ST/DT deciding portion 20 receives the voice signal picked up by the microphone 14 (this signal is referred to as a "picked-up signal" hereinafter), the pseudo regression voice signal that the adaptive filter 16 outputs, the voice signal that is received from the far end side and is output from the far-end decision information extracting portion 12 (this signal is referred to as an "emitted signal" hereinafter). The ST/DT deciding portion 20 makes a decision by using these signals as follows.

When the picked-up signal is below a predetermined level, the ST/DT deciding portion 20 considers that both the near end and the far end are not talking and decides a talking state as the silent. When the picked-up signal is above a predetermined level, the ST/DT deciding portion 20 calculates a correlation coefficient between the picked-up signal and the pseudo regression voice signal. When the correlation coefficient is above 0 but below a first threshold value, the ST/DT deciding portion 20 decides the talking state as the near-end side single talk. When the correlation coefficient is above the first threshold value but below a second threshold value, the ST/DT deciding portion 20 decides the talking state as the double talk. When the correlation coefficient is the second threshold value or more, the ST/DT deciding portion 20 decides the talking state as the far-end side single talk. Also, when the picked-up signal is above a predetermined level and the emitted signal is below a predetermined level (this level may be set equally to or differently from the level of the picked-up signal), the ST/DT deciding portion 20 decides the talking state as the near-end side single talk irrespective of a value of the correlation coefficient. When the correlation coefficient between the picked-up signal and the pseudo regression voice signal is low, the voice of the talker is picked up by the microphone 14. In such case, it may be considered that a regression voice signal that goes around from the speaker 13 to the microphone 14 is small, i.e., the talking state is the near-end side single talk. In contrast, when the correlation coefficient between the picked-up signal and the pseudo regression voice signal is high, the regression voice signal that goes around from the speaker 13 to the microphone 14 is large. Thus, it may be considered that the voice of the talker is not picked up, i.e., the talking state is the far-end side single talk. Also, when the correlation coefficient between the picked-up signal and the pseudo regression voice signal is at a middle level (between the first threshold value and the second threshold value), the regression voice signal that goes around from the speaker 13 to the microphone 14 exists to some extent and also the voice of the talker is picked up to some extent. That is, it may be considered that the talking state is the double talk.

Here, the present invention is not limited to an example in which the talking state is decided based on the picked-up signal, the regression voice signal, and the emitted signal all being input as described above. For example, the talking state may be decided based on levels of the picked-up signal and the emitted signal.

The ST/DT deciding portion 20 outputs the decision result to the decision information attaching portion 19. The decision information attaching portion 19 attaches decision information input from the ST/DT deciding portion 20 to voice information that is transmitted to the far-end side. This decision information is used as far-end decision information in the destination device on the far end side. That is, the far-end decision information extracted by the far-end decision information extracting portion 12 shows the result decided as above in the device on the far end side.

The ST/DT deciding portion 20 decides the final result (the far-end side single talk, the near-end side single talk, the double talk, and the silent) by using the decision result of own device side (suppose as near-end decision information) and the far-end decision information extracted by the far-end decision information extracting portion 12. The ST/DT deciding portion 20 decides whether or not the signal should be attenuated by the echo suppressor 17 and its level if the attenuation is applied, based on this final result. The ST/DT deciding portion 20 decides the final result based on a decision table shown in FIG. 2.

FIG. 2 is a view showing the decision table. This decision table is stored in an internal memory (not shown) in the ST/DT deciding portion 20. When the near-end decision information indicates the near-end side single talk and the far-end decision information indicates the near-end side single talk, the ST/DT deciding portion 20 decides the final result as the double talk. As described above, when the correlation coefficient between the picked-up signal and the pseudo regression voice signal is above the first threshold value but below the second threshold value, the ST/DT deciding portion 20 decides the talking state as the double talk. In such case, when the talking state is changed from the near-end side single talk to the double talk, the correlation coefficient between the picked-up signal and the pseudo regression voice signal becomes low (below the first threshold value) until the filter coefficient of the adaptive filter 16 is updated. Therefore, when both the near-end decision information and the far-end decision information indicate the near-end side single talk, the ST/DT deciding portion 20 sets the final result as the double talk (initial).

Also, when the near-end decision information indicates the near-end side single talk and the far-end decision information indicates the far-end side single talk, the ST/DT deciding portion 20 sets the final result as the near-end side single talk as it is. When the near-end decision information indicates the near-end side single talk and the far-end decision information indicates the double talk, the ST/DT deciding portion 20 sets the final result as the double talk (initial) or the near-end side single talk. Here, the ST/DT deciding portion 20 refers to the final results in the past. The ST/DT deciding portion 20 can hold the calculated final results in an internal memory, and refer to the preceding final result. When the preceding final result indicates the double talk, the ST/DT deciding portion 20 decides the final result at this time as the near-end side single talk. This is because the talking state is decided as the double talk until the filter coefficient is updated in the far-end side device. When the preceding final result indicates the near-end side single talk, the ST/DT deciding portion 20 decides the final result at this time as the double talk. This is because the talking state is decided as the near-end side single talk until the filter coefficient is updated in its own device.

Also, when the near-end decision information indicates the near-end side single talk and the far-end decision information indicates the silent, the ST/DT deciding portion 20 decides the final result as the near-end side single talk as it is (the talking state is changed from the silent to the near-end side single talk). This is because, when the talking state is changed from the silent to the near-end side single talk, the talking state is decided as the silent until the filter coefficient is updated in the far-end side device.

When the near-end decision information indicates the far-end side single talk and the far-end decision information indicates the near-end side single talk, the ST/DT deciding portion 20 decides the final result as the far-end side single talk as it is. When the near-end decision information indicates the far-end side single talk and the far-end decision information indicates the far-end side single talk, the ST/DT deciding portion 20 decides the final result as the silent. This is because the ST/DT deciding portion 20 decides the final result as the far-end side single talk until the filter coefficient of the adaptive filter 16 is updated immediately after the talking stops on both the far-end side and the near-end side (i.e., the double talk is ended).

Also, when the near-end decision information indicates the far-end side single talk and the far-end decision information indicates the double talk, the ST/DT deciding portion 20 decides the final result as the far-end side single talk as it is (the talking state is changed from the double talk to the far-end side single talk). This is because the ST/DT deciding portion 20 decides the final result as the double talk until the filter coefficient is updated in the far-end side device.

Also, when the near-end decision information indicates the far-end side single talk and the far-end decision information indicates the silent, the ST/DT deciding portion 20 decides the final result as the far-end side single talk as it is. Also, when the final result is decides as either of the far-end side single talk and the silent, the ST/DT deciding portion 20 decides the final result as the far-end side single talk as it is, for the echo suppressor 17 is caused to attenuate the signal in both talking states.

Also, when the near-end decision information indicates the double talk and the far-end decision information indicates the near-end side single talk, the ST/DT deciding portion 20 the ST/DT deciding portion 20 decides the final result as the double talk (initial) or the far-end side single talk. Here, the ST/DT deciding portion 20 refers to the final results in the past. When the preceding final result indicates the double talk, the ST/DT deciding portion 20 decides the final result at this time as the far-end side single talk. This is because the talking state is decided as the double talk until the filter coefficient is updated in its own device. When the preceding final result indicates the far-end side single talk, the ST/DT deciding portion 20 decides the final result at this time as the double talk. This is because the talking state is decided as the near-end side single talk until the filter coefficient is updated in the far-end side device.

Also, when the near-end decision information indicates the double talk and the far-end decision information indicates the far-end side single talk, the ST/DT deciding portion 20 decides the final result as the near-end side single talk (the talking state is changed from the double talk to the near-end side single talk). This is because, when the talking state is changed from the double talk to the near-end side single talk, the ST/DT deciding portion 20 decides the final result as the double talk until the filter coefficient is updated in its own device.

Also, when the near-end decision information indicates the double talk and also the far-end decision information indicates the double talk, the ST/DT deciding portion 20 decides the final result as the double talk as it is. Also, when the near-end decision information indicates the double talk and the far-end decision information indicates the silent, the ST/DT deciding portion 20 decides the final result as the near-end side single talk (the talking is started on the near-end side while the talking is ended on the far-end side).

Also, when the near-end decision information indicates the silent and also the far-end decision information indicates the near-end side single talk, the ST/DT deciding portion 20 decides the final result as the far-end side single talk (the talking is changed from the silent to the far-end side single talk). This is because, when the talking state is changed from the silent to the far-end side single talk, the ST/DT deciding portion 20 decides the final result as the silent until the filter coefficient is updated in its own device.

Also, when the near-end decision information indicates the silent and also the far-end decision information indicates the far-end side single talk, the ST/DT deciding portion 20 decides the final result as the silent as it is. Also, when the final result is decides as either of the far-end side single talk and the silent, the ST/DT deciding portion 20 decides the final result as the silent as it is, for the echo suppressor 17 is caused to attenuate the signal in both talking states.

Also, when the near-end decision information indicates the silent and also the far-end decision information indicates the double talk, the ST/DT deciding portion 20 decides the final result as the far-end side single talk (the talking is stopped on the near-end side while the talking is started on the far-end side). Also, when the near-end decision information indicates the silent and also the far-end decision information indicates the silent, the ST/DT deciding portion 20 decides the final result as the silent as it is.

Here, in case the far-end decision information extracting portion 12 cannot extract the far-end decision information, the near-end decision information may be used as the final result as it is.

As described above, the ST/DT deciding portion 20 decides the final result, and decides whether or not the signal should be attenuated by the echo suppressor 17 and its level if the attenuation is applied, based on this final result. It may be set that, when the final result is either the far-end side single talk or the silent, the ST/DT deciding portion 20 causes the echo suppressor 17 to attenuate the signal while, when the final result is either of the near-end side single talk or the double talk, the ST/DT deciding portion 20 does not cause the echo suppressor 17 to attenuate the signal. Here, even in the case of the double talk, the ST/DT deciding portion 20 may cause the echo suppressor 17 to attenuate the signal. In this case, an attenuation level is set smaller than the case of the far-end side single talk or the silent. If the signal is caused to reduce no matter how little in the case of double talk, a risk of echo generation can be reduced.

In this embodiment, the example in which the ST/DT deciding portion decides whether or not the signal should be attenuated by the echo suppressor 17 and its level if the attenuation is applied, based on this final result is explained. But the present invention is not limited to this example. For example, the signal processing portion 18 may be ON/OFF-controlled. Also, in the talking states except the far-end side single talk, a updating speed of the filter coefficient of the adaptive filter 16 may be stopped or the updating may be slowed down.

Next, FIG. 3 is a flowchart showing an operation of the ST/DT deciding portion 20. First the ST/DT deciding portion 20 decides whether or not the picked-up signal is in excess of a predetermined level (S11). If the picked-up signal is below a predetermined level, the ST/DT deciding portion 20 decides the near-end decision information as the silent (S12). If the picked-up signal is in excess of the predetermined level, the ST/DT deciding portion 20 decides whether or not the emitted signal exceeds a predetermined level (this level may be set equally to or differently from the level of the picked-up signal) (S13). If the emitted signal is below the predetermined level, the ST/DT deciding portion 20 decides the near-end decision information as the near-end side single talk (S17). If the emitted signal is the predetermined level or more, the ST/DT deciding portion 20 calculates the correlation coefficient between the picked-up signal and a pseudo regression voice signal (S14). If this correlation coefficient is below a first threshold value, the ST/DT deciding portion 20 decides the near-end decision information as the near-end side single talk (S14→S17). If this correlation coefficient is above the first threshold value but below a second threshold value, the ST/DT deciding portion 20 decides the near-end decision information as the double talk (S14→S15). If this correlation coefficient is the second threshold value or more, the ST/DT deciding portion 20 decides the near-end decision information as the far-end side single talk (S14→S16).

The ST/DT deciding portion 20 derives the near-end decision information as described above, and outputs this information to the decision information attaching portion 19 (S18). Then, the ST/DT deciding portion 20 decides whether or not the far-end decision information is present (S19). If no far-end decision information is present, the ST/DT deciding portion 20 decides the near-end decision information as the final result as it is (S20). If the far-end decision information is present, the ST/DT deciding portion 20 reads the decision table shown in FIG. 2 and the final results in the past and then decides the final result at this time based on them (S21). Finally, the ST/DT deciding portion 20 decides whether or not the signal should be attenuated by the echo suppressor 17 and its level if the attenuation is applied, based on the final decision result (S22).

As described above, the talk session system of the present embodiment decides the final result based on the decision result made by its own device and the far-end decision information received from the far-end side, and therefore the accuracy in sensing the far-end side single talk, the near-end side single talk, the double talk, and the silent can be improved. In particular, there is a strong possibility that the far-end side single talk is misunderstood as the double talk because, in the far-end side single talk, a level of the emitted signal is high and the picked-up signal has a level to some extent, nevertheless a possibility of misunderstanding the far-end side single talk as the double talk can be suppressed by receiving the information indicating the near-end side single talk as the far-end decision information. The near-end side single talk is hardly misunderstood as the double talk because only the picked-up signal is at a high level, and therefore the accuracy of sensing can be improved largely by receiving this information from the far-end side.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

What is claimed is:

1. A talk deciding system, comprising:
a receiving portion which receives from a far-end side far-end side decision information indicating a talking state on the far-end side;
an inputting portion which inputs an emitted signal from the far-end side;
a speaker which emits the emitted signal being input into the inputting portion;
a microphone which picks up a voice on a near-end side and outputs a picked-up signal;
a deciding portion which preliminarily decides a preliminary talking state on the near-end side based on the picked-up signal being output from the microphone and the emitted signal being input into the speaker, and generates near-end side decision information indicating the preliminary talking state on the near-end side, wherein the deciding portion decides a final talking state on the near-end side based on the far-end side decision information being received at the receiving portion and on the near-end side decision information;
a transmitting portion which attaches the near-end side decision information generated by the deciding portion to voice information based on the picked-up signal, and transmits the near-end side decision information and the voice information to the far-end side; and
an echo suppressor which attenuates the voice signal to be output to the far-end side,
wherein the deciding portion sets whether or not an attenuation should be made by the echo suppressor and a level of attenuation, based on the decided final talking state on the near-end side.

2. The talk deciding system according to claim 1, wherein the deciding portion holds in a memory the decided final talking state on the near-end side, and subsequently decides an updated final talking state on the near-end side based on the far-end side decision information, the near-end side decision information, and the final talking state on the near-end side decided previously and held in the memory.

3. The talk deciding system according to claim 1, further comprising:
an adaptive echo canceller which includes:
an adaptive filter for receiving the emitted signal and outputting a pseudo signal of a regression voice signal which goes around from the speaker to the microphone; and
a post processor for subtracting the pseudo signal from the picked-up signal,
wherein the deciding portion preliminarily decides the preliminary talking state on the near-end side based on the pseudo signal, the picked-up signal, and the emitted signal.

* * * * *